Nov. 9, 1971  H. H. GIBBS  3,618,211
CHEESE SHREDDER AND SPREADER DEVICE FOR PIZZA PIES AND THE LIKE
Filed Dec. 5, 1969
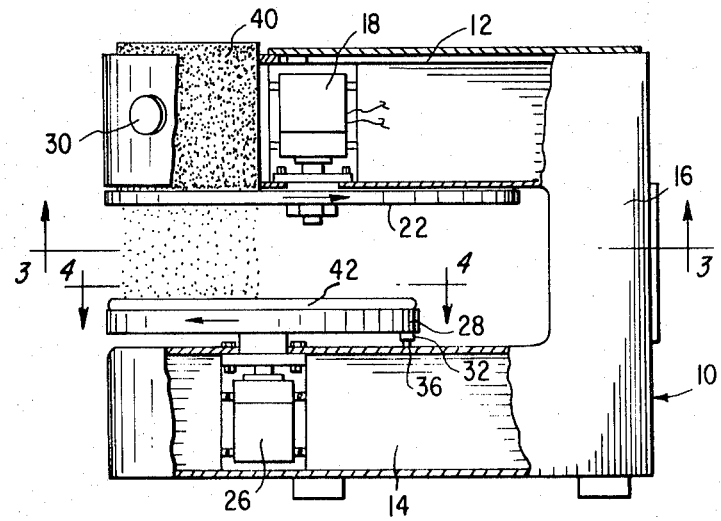
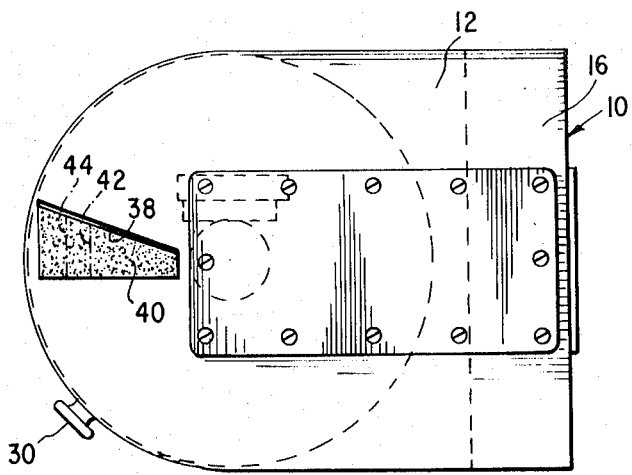
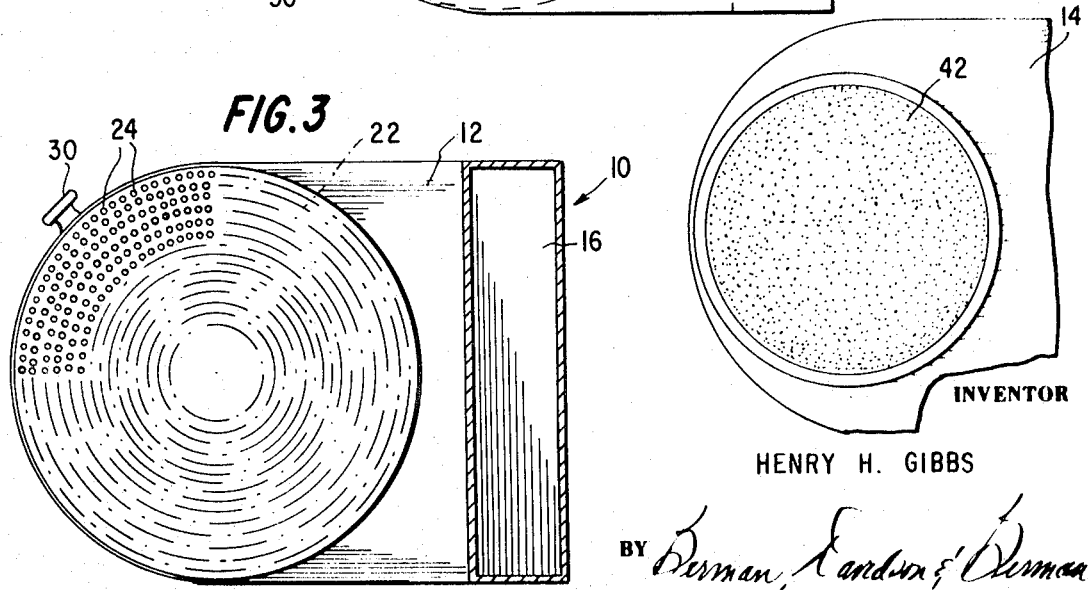
INVENTOR
HENRY H. GIBBS

United States Patent Office 3,618,211
Patented Nov. 9, 1971

3,618,211
CHEESE SHREDDER AND SPREADER DEVICE
FOR PIZZA PIES AND THE LIKE
Henry H. Gibbs, 3010 Rice Ave., Pueblo, Colo. 81005
Filed Dec. 5, 1969, Ser. No. 882,442
Int. Cl. A01j 21/00
U.S. Cl. 31—6
5 Claims

ABSTRACT OF THE DISCLOSURE

A cheese shredder and spreader device for use in making pizza pie and the like, comprising a substantially C-shaped frame with a circular or disk-like shredder disposed adjacent the upper portion of the C-frame with a wedge shaped opening for holding cheese therein to be shredded by said disc member, and a lower platform for holding the pizza dough, said lower platform being disposed below said shredder and adapted to receive the shredded cheese therefrom, with means for rotating said shredder and for rotating said lower platform for one turn only to spread a predetermined and uniform amount of cheese and the like on the dough disposed on the lower platform.

---

The present invention relates to a shredder or grating device for use in the food industry and means for depositing the shredded material on a rotatable platform upon which a pizza pie or a predetermined size of pizza dough is disposed so as to receive the grated material thereon.

It is another object of the present invention to provide a shredder and spreader device to freshly shred and simultaneously distribute material such as grated cheese evenly on the surface of a pizza pie to the desired concentration.

It is still another object of the present invention to provide a shredder and spreader device which consists basically of a lower disc or platen and an upper disc or shredder mounted within a C-shape frame and cover with two electric motors being contained within the frame and integrally attached to gear reducers for rotation of the discs at the proper speed.

It is still another object of the present invention to provide a pizza shredder and spreader that is started when a start button is depressed so that the motors of the upper shredder disc and the lower pizza pie platen are simultaneously started and continue to run until a switch operator disposed on the lower side of the pizza pie platen has completed one turn or one revolution and made contact with a micro switch on the lower side of the C-frame, which micro switch, working through a relay, breaks the electrical circuit and resets the start button for the next cycle of the machine.

It is another object of the present invention to provide a shredding and spreading machine that will deliver fresh shredded cheese to the pizza dough pie and which reduces waste in the preparation of pizza and creates great labor savings, and further promotes faster service to the customer and a sanitary method of food handling.

Still another object of the present invention is to provide a shredder and spreader device that is capable of preparing a complete service to the pizza manufacturer and which can further be used to include spreading of tomato sauce, meat chunks, and any other desired toppings, and which can be further utilized to grate and distribute nut meats and other toppings for cakes, pies and the like in the baking industry.

Various other objects and advantages of the present invention will be readily apparent from the following detailed description when considered in conjunction with the accompanying drawing forming a part thereof, and in which, FIG. 1 is a side elevational view of the embodiment of the invention with parts broken away to show the interior of portions of the C-type frame.

FIG. 2 is a plan view of FIG. 1.

FIG. 3 is a section taken along the lines 3—3 of FIG. 1, and

FIG. 4 is a fragmentary view taken along the lines 4—4 of FIG. 1, illustrating the lower platen that holds the pizza pie dough.

Referring to the drawings, the reference numeral 10 generally designates the shredder and spreader machine or device of the present invention and is provided with an upper substantially horizontally extending hollow housing or frame 12 and a lower hollow housing or frame 14 directly below the frame 12 wih a substantially vertical hollow frame portion 16 extending therebetween, as best seen in FIG. 1, so that the machine is of a substantially C-type frame, or has a substantially C-shape or configuration.

The upper portion of the frame 12 is provided with a motor 18 therein having an integral gear reducer to which is attached a circular upper platen or disc 22 which is a cheese shredder or grater. The disc 22 has its surface covered with a plurality of shredder openings partially edged by teeth 24, as best seen in FIG. 3. This upper disc, or shredder disc 22 is powered by the motor and the gear reducer so that it will rotate at a speed of five revolutions in three seconds, or 100 r.p.m.

The lower hollow frame portion 14 is also provided with an electric motor 26 therein having an integral gear reducer and the output shaft of this gear reducer drives the circular lower platen 28 at a speed of 1 revolution in 3 seconds, or 20 r.p.m. A start button 30 is provided in the upper frame portion 12 and is operatively connected to the motors 18 and 26 by well-known means to simultaneously start the motors when the start button is depressed. The lower pizza pie platen 28 has a switch operator 32 extending therebelow on the lower side of the platen so that when this pizza platen 28 completes one revolution, it will make contact with a microswitch 36 disposed on the upper surface of the lower frame portion 14, as best seen in FIG. 1.

This microswitch 36, working through a relay, breaks the electrical circuit and resets the start button 30 for the next cycle.

The motor control circuit defining the drive means to drive lower disc 28 for one complete turn only, in itself, is conventional and is well-known in the art. Such equivalent motor control circuits are shown, for example, in U.S. Pat. No. 3,481,709 (FIG. 1) to T. Slone, U.S. Pat. No. 1,411,712 to F. Diehl, U.S. Pat. No. 1,440,610 to A. G. Kupetz, U.S. Pat. No. 1,853,960 to W. T. Cunningham, U.S. Pat. No. 1,934,914 to A. Dahlstrom, and U.S. Pat. No. 2,296,549 to H. E. Williams et al.

The upper frame 12 is provided with a wedge-shaped opening 38 therein to receive a piece of cheese designated 40 therein. This wedge-shaped opening 38 is open at the bottom so that the block of the wedge-shaped cheese 40 will come in contact with the shredding members, or shredding teeth 24 of the shredder disc 22 as it is rotated and the openings in the shredder plate will allow the grated cheese to fall down onto the pizza pie dough 42 disposed on the lower platen 28, as clearly seen in FIG. 1. It will also be noted that the wedge-shaped opening 38 in the upper frame 13 is provided with block-off plugs, indicated in dotted lines at 42 and 44 to allow for use of smaller wedges, or cuts of cheese.

The cheese, which has been pre-shaped from a standard brick, is inserted from the top through the opening 38 provided in the frame. The shape of the cheese is so designed as to allow an equal amount of cheese to be deposited on the periphery of the shredder as at the center thereof.

Consequently, equal amounts of cheese are distributed on the outer portion of the pizza pie as are distributed on the center thereof. These block-off plugs allow for the use of smaller cuts of cheese, three in all, and thus will accommodate 12, 10 and 8-inch pizza pies to be processed in the same machne, while merely changing the size of the cheese being used.

Thus, from the foregoing description, it is apparent that the present invention provides an economical shredder and spreader device for spreading cheese and the like on a pizza pie to provide fast sanitary service in the method of food handling.

From the foregoing description, it is apparent that modification in the arrangement of the parts of this invention may be made without departing from the spirit thereof, and the scope of the invention is not to be limited except in accordance with the appended claims.

What is claimed is:

1. A shredder and spreader device for making pizza pies and the like, comprising a frame having an upper portion and a lower portion spaced in substantial vertical alignment therebelow with rotatable shredder means on said upper frame portion, a rotatable disc on said lower frame portion to receive shredded material therefrom distributed evenly over its surface, wherein said frame has a substantially C-shaped configuration with a vertical frame portion extending between said upper and lower frame portions, and drive means in said frame portions to drive said lower rotatable disc for one complete turn only.

2. The device of claim 1 wherein said shredder means includes a disc with shredder members having openings therein on its upper surface and said upper frame portion has a wedge shape opening therein above said shredder disc to receive a wedge shaped block of cheese therein.

3. The device of claim 1 wherein said lower disc has a switch operator member on its lower side and said lower frame portion has a micro switch means on its upper surface adapted to be actuated by said switch member.

4. The device of claim 3 wherein said wedge opening is of sufficient size to receive block-off plugs when the wedge shaped cheese block is disposed therein of substantially smaller dimension than said wedge opening.

5. The device of claim 4 wherein said lower disc is of smaller diameter than said shredder disc and has its outer periphery in vertical alignment with the outer periphery of said shredder disc.

References Cited

UNITED STATES PATENTS

| | | | |
|---|---|---|---|
| 2,481,336 | 9/1949 | Orlando | 146—92 |
| 2,496,780 | 2/1950 | DeNardis et al. | 146—177 |
| 2,639,748 | 5/1953 | Peel | 146—177 |
| 2,796,103 | 6/1957 | Feinstein | 146—177 X |

HUGH R. CHAMBLEE, Primary Examiner

U.S. Cl. X.R.

31—21; 146—177